(12) United States Patent
Fukuda et al.

(10) Patent No.: US 11,364,518 B2
(45) Date of Patent: Jun. 21, 2022

(54) JOINED MEMBER MANUFACTURING APPARATUS, METHOD FOR MANUFACTURING JOINED MEMBER, AND METHOD FOR MANUFACTURING MEMBER ON WHICH APPLIED MATERIAL HAS BEEN APPLIED

(71) Applicant: ORIGIN ELECTRIC COMPANY, LIMITED, Saitama (JP)

(72) Inventors: Kazuhiro Fukuda, Saitama (JP); Hideyuki Kokaji, Saitama (JP); Masaki Sakamoto, Saitama (JP)

(73) Assignee: ORIGIN COMPANY, LIMITED, Saitama (JP)

( * ) Notice: Subject to any disclaimer, the term of this patent is extended or adjusted under 35 U.S.C. 154(b) by 914 days.

(21) Appl. No.: 16/077,993

(22) PCT Filed: Jan. 23, 2017

(86) PCT No.: PCT/JP2017/002187
§ 371 (c)(1),
(2) Date: Aug. 14, 2018

(87) PCT Pub. No.: WO2017/141634
PCT Pub. Date: Aug. 24, 2017

(65) Prior Publication Data
US 2021/0268537 A1    Sep. 2, 2021

(30) Foreign Application Priority Data

Feb. 19, 2016  (JP) .............................. JP2016-030110
Feb. 19, 2016  (JP) .............................. JP2016-030111

(51) Int. Cl.
*B05C 5/02*    (2006.01)
*B05C 13/02*    (2006.01)
(Continued)

(52) U.S. Cl.
CPC ............ *B05C 13/02* (2013.01); *B05C 5/0254* (2013.01); *B05C 11/10* (2013.01); *B05D 3/067* (2013.01); *B05D 7/24* (2013.01)

(58) Field of Classification Search
None
See application file for complete search history.

(56) References Cited

U.S. PATENT DOCUMENTS 5,700,325 A * 12/1997 Watanabe ............. B05C 5/0254
                                                      118/411
2012/0244284 A1* 9/2012 Sanada ................. B05C 5/0216
                                                      427/256

FOREIGN PATENT DOCUMENTS

JP    2003-112103 A     4/2003
JP    WO2010131580    * 11/2010
(Continued)

OTHER PUBLICATIONS

English translation of JP5831228B2 corresponding to WO2010131580.*
(Continued)

*Primary Examiner* — Charles Capozzi
(74) *Attorney, Agent, or Firm* — Squire Patton Boggs (US) LLP

(57) ABSTRACT

To provide a joined member manufacturing apparatus, a method for manufacturing a joined member, and a method for manufacturing a member on which an applied material has been applied, with which it is possible to apply an applied material even in cases where a projection is present in the vicinity of an outer side of an application width of an applied material to be applied on an application target surface. A joined member manufacturing apparatus includes an application device including die head 10 having a distance between the ejection port forming groove and an outer edge of the first opposing face at a portion where an ejection port is formed being 0.1 mm to 1.0 mm, a first suction stage (Continued)

20A, a second suction stage 20B, an ultraviolet irradiator 45 configured to radiate an ultraviolet ray, a chamber 51 formed to have a size enabling the chamber 51 to accommodate the first and second suction stages 20A and 20B at the same time, the chamber 51 being configured such that a degree of vacuum inside the chamber 51 is adjustable by an operation of a vacuum pump 53, where the applied material G is configured such that viscosity of the applied material G changes when the applied material G is irradiated with an ultraviolet ray.

8 Claims, 6 Drawing Sheets

(51) Int. Cl.
*B05C 11/10* (2006.01)
*B05D 3/06* (2006.01)
*B05D 7/24* (2006.01)

(56) References Cited

FOREIGN PATENT DOCUMENTS

| | | |
|---|---|---|
| JP | 2013-176736 A | 9/2013 |
| JP | 2014-039911 A | 3/2014 |
| JP | 2014-233651 A | 12/2014 |
| JP | 2015-127048 A | 7/2015 |
| JP | 2015-136675 A | 7/2015 |
| JP | 2015-155089 A | 8/2015 |
| WO | WO 2010/131580 A1 | 11/2010 |

OTHER PUBLICATIONS

English translation of JP 2015-127048.*
International Search Report for PCT/JP2017/002187, dated Apr. 25, 2017.

* cited by examiner

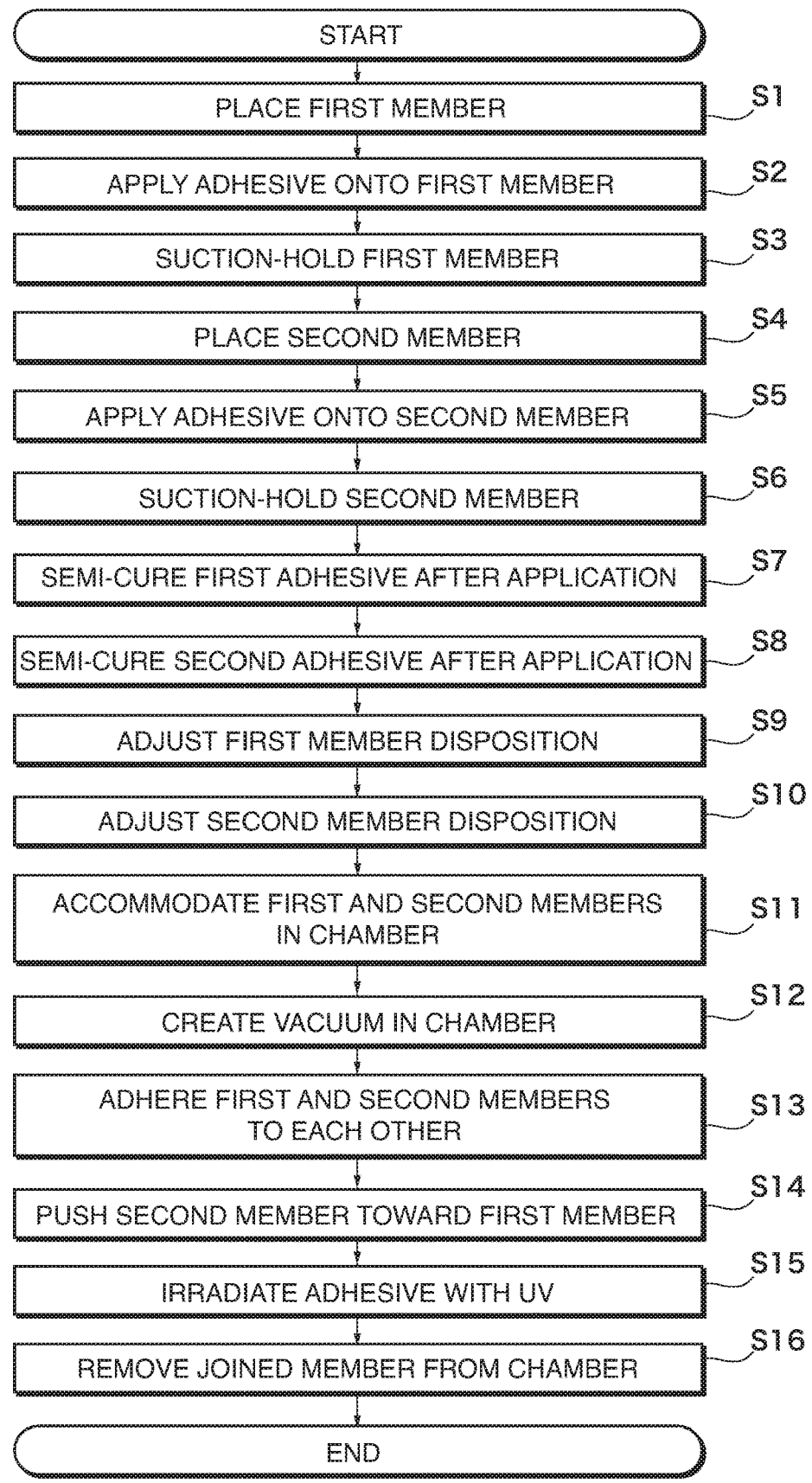

JOINED MEMBER MANUFACTURING APPARATUS, METHOD FOR MANUFACTURING JOINED MEMBER, AND METHOD FOR MANUFACTURING MEMBER ON WHICH APPLIED MATERIAL HAS BEEN APPLIED

TECHNICAL FIELD

The present invention relates to a joined member manufacturing apparatus, a method for manufacturing a joined member, and a method for manufacturing a member on which an applied material has been applied, and in particular, to a joined member manufacturing apparatus, a method for manufacturing a joined member, and a method for manufacturing a member on which an applied material has been applied, with which it is possible to apply an applied material even in cases where a projection is present in the vicinity of an outer side of an application width of an applied material to be applied on an application target surface.

BACKGROUND ART

For example, in a step for manufacturing a liquid crystal panel, a liquid crystal substrate and protective glass are adhered to each other through an adhesive. When two members are adhered to each other in this way through an applied material such as an adhesive, the applied material is applied onto a bonding surface of each member. As means for applying an applied material onto the bonding surface of a member, there is one which uses a die head (application head) to eject applied material onto the bonding surface of the member in a non-contact manner to form an applied film. One example of such a die head is configured such that the die head is divided into two heads and these heads hold in between a shim plate that forms an ejection port between the two heads; this configuration makes it easier to vary the ejected amount of applied material (see, for example, Patent Document 1).

Prior Art Document

Patent Document

Patent Document 1: JP 2014-233651 A (FIG. 2, etc.)

SUMMARY OF THE INVENTION

Problem to be Solved by the Invention

With the die head disclosed in Patent Document 1, however, since the die head holds the shim plate by covering the same from three directions so as to prevent the shim plate from displacing or coming off, the width of the die head unfavorably becomes larger than the application width of the applied material. Thus, in cases where, for example, a projection is present in the vicinity of the outer side of the application width of the applied material to be applied, the applied material cannot be applied with a predetermined application width.

In view of the problem stated above, it is an object of the present invention to provide a joined member manufacturing apparatus, a method for manufacturing a joined member, and a method for manufacturing a member on which an applied material has been applied, with which it is possible to apply an applied material even in cases where a projection is present in the vicinity of an outer side of an application width of an applied material to be applied on an application target surface.

Means for Solving the Problem

To achieve the above object, a joined member manufacturing apparatus according to the first aspect of the present invention includes, as shown in FIGS. 3 to 4C, for example, a die head 10. The die head 10 is configured to apply an applied material G onto an application target surface Ef of an application target member E by ejecting the applied material G onto the application target surface Ef during relative movement of the die head 10 along the application target surface Ef. The die head 10 includes a first head constituting member 11 including a first opposing face 11f formed on the first head constituting member 11, and a second head constituting member 12 including a second opposing face 12f formed on the second head constituting member 12, the second opposing face 12f contacting the first opposing face 11f. The first opposing face 11f includes an ejection port forming groove 11h formed in the first opposing face 11f, and the ejection port forming groove 11h forms a narrow, elongated ejection port 10h through which the applied material G is ejected to outside the die head 10. A distance 11eL between the ejection port forming groove 11h and an outer edge 11e of the first opposing face 11f is 0.1 mm to 1.0 mm, and the distance 11eL is at a position where the ejection port 10h is formed in a direction in which the ejection port 10h is elongated. In addition, the joined member manufacturing apparatus includes, as shown in FIG. 1, for example, a first suction stage 20A configured to suction-hold the first application target member D, the application target surface Df of which D has received application of the applied material G; a second suction stage 20B configured to suction-hold the second application target member E, the application target surface Ef of which E has received application of the applied material G, the second suction stage 20B being disposed in a manner in which the second application target member E suction-held on the second suction stage 20B can be adhered onto the first application target member D suction-held on the first suction stage 20A; an ultraviolet irradiator 45 configured to radiate an ultraviolet ray; and a chamber 51 formed to have a size enabling the chamber 51 to accommodate the first and second suction stages 20A and 20B at the same time, the chamber 51 being configured such that a degree of vacuum inside the chamber 51 is adjustable by an operation of a vacuum pump 53, wherein the applied material G is configured such that viscosity of the applied material G changes when the applied material G is irradiated with an ultraviolet ray.

With this configuration, the distance between the ejection port forming groove and the outer edge of the first opposing face at the portion where the ejection port is formed is short; therefore, even in cases where a projection is present in the vicinity of the outer side of the application width of the applied material on the application target surface, the applied material can be applied without interference of the die head with the projection.

As for the joined member manufacturing apparatus according to the second aspect of the present invention, as shown in FIGS. 4A to 4C, for example, in the joined member manufacturing apparatus according to the first aspect, the first opposing face 11f further includes a reservoir forming groove 11r and a communication part forming groove 11c formed in the first opposing face 11f, the reservoir forming groove 11r forming a reservoir 10r configured to temporarily hold the applied material G, the reservoir forming groove 10r having a larger width than a width of the ejection port 10h in the direction in which the ejection port 10h is elongated, the communication part forming groove 11c providing communication between the ejection port forming groove 11h and the reservoir forming groove 11r, and a width of the first opposing face 11f at a portion where the ejection port forming groove 11h is formed is smaller than a width of the first opposing face 11f at a portion where the reservoir forming groove 11r is formed, these widths being widths in the direction in which the ejection port 10h is elongated.

With this configuration, the width of the first opposing face at the portion where the ejection port forming groove is formed is smaller than the width of the first opposing face at the portion where the reservoir is formed; therefore, even in cases where a projection is present in the vicinity of the outer side of the application width of the applied material on the application target surface, the applied material can be applied without interference of the die head with the projection while also suppressing ejection unevenness of the applied material ejected through the ejection port.

As for the joined member manufacturing apparatus according to the third aspect of the present invention, as shown in FIG. 3, for example, the joined member manufacturing apparatus according to the first or second aspect further includes a placement table 20 on which the application target member E is placed, and a position confirmation device 40 configured to ascertain a position of the application target member E placed on the placement table 20 relative to the die head 10.

With this configuration, it is possible to specify the application position of the applied material on the application target surface; therefore, even in cases where a projection is present on the application target surface, interference of the die head with the projection can be avoided.

As for the joined member manufacturing apparatus according to the fourth aspect of the present invention, as shown in FIG. 3, for example, the joined member manufacturing apparatus according to any one of the first to third aspects further includes a moving device 30 configured to move the placement table 20 relative to the die head 10; and a controller 90 configured to, while the position confirmation device 40 is performing confirmation, control movement of the moving device 30 in a manner in which a predetermined position of the application target surface Ef of the application target member E placed on the placement table 20 meets a reference position of the die head 10.

With this configuration, the applied material can be applied onto a predetermined position on the application target surface.

As for the joined member manufacturing apparatus according to the fifth aspect of the present invention, as shown in FIG. 3, for example, in the joined member manufacturing apparatus according to the fourth aspect, the moving device 30 is configured to be able to move the placement table 20 in a direction in which the ejection port 10h (shown in FIG. 4A, for example) extends and in a direction horizontally perpendicular to the direction in which the ejection port 10h extends.

As for the joined member manufacturing apparatus according to the sixth aspect of the present invention, as shown in FIG. 3, for example, in the joined member manufacturing apparatus according to fourth or fifth aspect, the moving device 30 is configured to be able to move the placement table 20 vertically relative to the die head 10 and rotate the placement table 20 about an imaginary axis 32a extending vertically through a centroid of the placement table 20.

As for the joined member manufacturing apparatus according to the seventh aspect of the present invention, as shown in FIGS. 4A to 4C, for example, in the joined member manufacturing apparatus according to any one of the first to sixth aspects, the ejection port 10h is formed on a tip end of a protrusion 11p formed on one face of the die head 10, and a height by which the protrusion 11p protrudes is 3 mm to 8 mm.

With this configuration, it is possible to avoid a variety of projections that may be present on an outer side of the application width of the applied material.

As for a method for manufacturing a joined member according to the eighth aspect of the present invention, as shown in FIGS. 3 to 5, for example, the method for manufacturing a joined member in which two application target members E are adhered to each other by using an application device. The application device includes a die head 10. The die head 10 is configured to apply an applied material G onto an application target surface Ef of an application target member E by ejecting the applied material G onto the application target surface Ef during relative movement of the die head 10 along the application target surface Ef. The die head 11 includes a first head constituting member 11 including a first opposing face 11f formed on the first head constituting member 11, and a second head constituting member 12 including a second opposing face 12f formed on the second head constituting member 12, the second opposing face 12f contacting the first opposing face 11f, wherein the first opposing face 11f includes an ejection port forming groove 11h formed in the first opposing face 11f, the ejection port forming groove 11h forming a narrow, elongated ejection port 10h through which the applied material G is ejected to outside the die head 10, wherein a distance 11eL between the ejection port forming groove 11h and an outer edge 11e of the first opposing face 11f is 0.1 mm to 1.0 mm, the distance 11eL being at a position where the ejection port 10h is formed in a direction in which the ejection port 10h is elongated. The application device includes a placement table 20 on which at least one of the application target members E is placed, and a position confirmation device 40 configured to ascertain a position of the application target member E placed on the placement table 20 relative to the die head 10. The method includes a placing step (S1, S4) of placing at least one of the application target members E onto the placement table 20; an applying step (S2, S5) of, using the die head 10, applying the applied material G onto the application target surface Ef of the application target member E placed on the placement table 20; and an adhering step (S13) of adhering the two application target members E having received application of the applied material G to each other in a manner in which the applied material G applied on one application target member E and the applied material G applied on the other application target member are brought into contact with each other.

With this configuration, even in cases where a projection is present in the vicinity of the outer side of the application width of the applied material on the application target surface, it is possible to manufacture a joined member onto which the applied material is applied appropriately.

As for a method for manufacturing a member on which an applied material has been applied according to the ninth aspect of the present invention, as shown in FIGS. 3, 4A, 4B, 4C, 6A and 6B, for example, the method includes a first applied film forming step of forming a first applied film Ga, by a die head 10, onto an application target surface Ef of an application target member E. The die head 10 is configured to apply an applied material G onto the application target surface Ef of the application target member E by ejecting the applied material G onto the application target surface Ef during relative movement of the die head 10 along the application target surface Ef. The die head 10 includes a first head constituting member 11 including a first opposing face 11f formed on the first head constituting member 11, and a second head constituting member 12 including a second opposing face 12f formed on the second head constituting member 12, the second opposing face 12f contacting the first opposing face 11f, wherein the first opposing face 11f includes an ejection port forming groove 11h formed in the first opposing face 11f, the ejection port forming groove 11h forming a narrow, elongated ejection port 10h through which the applied material G is ejected to outside the die head 10, wherein an end portion thickness 11eL of the die head 10 as a distance between the ejection port forming groove 11h and an outer edge 11e of the first opposing face 11f is 0.1 mm to 1.0 mm, the distance being at a position where the ejection port 10h is formed in a direction in which the ejection port 10h is elongated. In the method, the first applied film Ga is the applied material G having a first predetermined length, the first applied film Ga being formed by the die head 10 ejecting the applied material G through the ejection port 10h, the die head 10 ejecting the applied material G while being in relative movement along the application target surface Ef. The method further includes a die head moving step of, in a state where ejection of the applied material G from the die head 10 has been stopped after the first applied film forming step, moving the die head 10 in an intersecting direction intersecting with a direction of the relative movement of the die head 10 in the first applied film forming step; and a second applied film forming step of, after the die head moving step, forming a second applied film Gb onto the application target surface Ef of the application target E, the second applied film Gb being the applied material G having a second predetermined length, the second applied film Gb being formed by the die head 10 ejecting the applied material G through the ejection port 10h, the die head 10 ejecting the applied material G while being in relative movement along the application target surface Ef; wherein in the die head moving step, the die head 10 is moved in the intersecting direction in a manner in which a shortest distance between a track of the ejection port 10h in forming the first applied film Ga and a track of the ejection port 10h in forming the second applied film Gb is 2 mm or smaller.

With this configuration, it is possible to apply the applied material uniformly over a range that is wider than the width of the ejection port of the die head.

As for a method for manufacturing a member on which an applied material has been applied according to the tenth aspect of the present invention, as shown in FIG. 6B, for example, a distance between a surface of the first applied film Ga and the ejection port 10h in the first applied film forming step and a distance H between a surface of the second applied film Gb and the ejection port 10h in the second applied film forming step are both 0 μm to 30 μm.

With this configuration, it is possible to suppress unevenness of the edges of the first and second applied films.

As for a method for manufacturing a joined member according to the eleventh aspect of the present invention, as shown in FIGS. 6A and 6B, for example, the method includes a step of manufacturing a member on which an applied material G has been applied, the member on which an applied material has been applied being the application target member onto which the applied material is applied using the method for manufacturing a member on which an applied material has been applied according to the ninth or tenth aspect of the present invention; a standing step of leaving the member on which an applied material has been applied to stand for a predetermined time period; and an adhering step of adhering together a member to be joined and the member on which an applied material has been applied after completion of the standing step.

With this configuration, since a standing step is provided, the applied material after application exhibits flowability so that a gap between the first and second applied films is closed, and therefore it is possible to suppress formation of voids between the adhered members.

In the method for manufacturing a joined member according to the eleventh aspect of the present invention, the member to be joined may be the member on which an applied material has been applied after completion of the standing step, in which case two of the members on which an applied material has been applied may be adhered to each other in a manner in which the respective applied materials on the two members are brought into contact with each other. Moreover, a curing step of curing the applied material may be provided after a joining step.

Further, the method for manufacturing a joined member according to a twelfth aspect may be, as shown in FIGS. 1 to 5 for example, a method for manufacturing a joined member C (see, for example, FIG. 2A) in which a first member D, on which a first joint surface Df is formed, and a second member E, on which a second joint surface Ef is formed, are joined together through a bonding agent G with a predetermined viscosity having a predetermined thickness, the method including: a first applying step (S2) of applying the bonding agent G having a first predetermined thickness onto the first joint surface Df; a second applying step (S5) of applying the bonding agent G having a second predetermined thickness onto the second joint surface Ef; and an adhering step (S13) of adhering the first and second members D and E to each other by bringing into contact a first bonding agent after application G1, which is the bonding agent G having been applied onto the first joint surface Df, and a second bonding agent after application G2, which is the bonding agent G having been applied onto the second joint surface Ef; where the first predetermined thickness may be a thickness according to which, when the first bonding agent after application G1 is brought into contact with the second bonding agent after application G2, the contour of the portion of the first bonding agent after application G1 in contact with the second bonding agent after application G2 encompasses a first predetermined region of the first joint surface Df as the contour is projected onto the first joint surface Df, yet according to which the bonding agent G does not extend outwardly beyond the first joint surface Df; and the second predetermined thickness may be a thickness according to which, when the second bonding agent after application G2 is brought into contact with the first bonding agent after application G1, the contour of the portion of the second bonding agent after application G2 in contact with the first bonding agent after application G1 encompasses a second predetermined region Eg (see, for example, FIG. 2C) of the second joint surface Ef as the contour is projected onto the second joint surface Ef, yet according to which the bonding agent G does not extend outwardly beyond the second joint surface Ef.

With this configuration, the joined member can be manufactured with a bonding agent having a predetermined thickness without the contours formed due to contact between the first and second bonding agents after application appearing in the first and second predetermined regions.

Further, the method for manufacturing a joined member according to a thirteenth aspect may be, as shown in FIGS. 1 to 5 for example, the above method for manufacturing a joined member according to the twelfth aspect further including: a first disposition adjusting step (S9) of adjusting disposition of the first member D onto which the bonding agent G has been applied, the first disposition adjusting step (S9) being provided before the adhering step (S13); and a second disposition adjusting step (S10) of adjusting disposition of the second member E onto which the bonding agent G has been applied, the second disposition adjusting step (S10) being provided before the adhering step (S13).

With this configuration, the first and second members can be adhered to each other while in an appropriate positional relationship.

Further, the method for manufacturing a joined member according to a fourteenth aspect may be, as shown in FIGS. 1 to 5 for example, the above method for manufacturing a joined member according to the twelfth or thirteenth aspect further including: a first semi-curing step (S7) of semi-curing the first bonding agent after application G1, the first semi-curing step (S7) being provided before the adhering step (S13); and a second semi-curing step (S8) of semi-curing the second bonding agent after application G2, the second semi-curing step (S8) being provided before the adhering step (S13).

With this configuration, it is possible to suppress a difference between the contour of the bonding agent at a portion where the bonding agent is in contact with the joint surface and the contour of the bonding agent at a portion where the bonding agent is in contact with the other bonding agent having been applied onto the other joint surface.

Further, the method for manufacturing a joined member according to a fifteenth aspect may be, as shown in FIGS. 1 to 5 for example, in the above method for manufacturing a joined member according to any one of the twelfth to fourteenth aspects, the adhering step (S13) may be performed in an environment with a predetermined degree of vacuum.

With this configuration, entrance of bubbles into the joined portion can be suppressed.

A joined member manufacturing apparatus according to a sixteenth aspect may be, as shown in FIG. 1 for example, an apparatus which joins a first member D, on which a first joint surface Df is formed, and a second member E, on which a second joint surface Ef is formed, to each other through a bonding agent G with a predetermined viscosity having a predetermined thickness, the apparatus including: a first holding tool 20A configured to hold the first member D; a second holding tool 20B configured to hold the second member E; a first application device 10A configured to apply the bonding agent G onto the first joint surface Df; a second application device 10B configured to apply the bonding agent G onto the second joint surface Ef; and a controller 90 configured to control the first and second application devices 10A an 10B in a manner in which the first application device 10A applies the bonding agent G having a first predetermined thickness onto the first joint surface Df and the second application device 10B applies the bonding agent G having a second predetermined thickness onto the second joint surface Ef, and control the first and second holding tools 20A and 20B in a manner in which the first and second holding tools 20A and 20B press the first and second joint surfaces Df and Ef respectively in a direction in which the first and second joint surfaces Df and Ef approach each other by making the bonding agent G applied onto the first member D and the bonding agent G applied onto the second member E oppose and contact each other; where a setting value of the first predetermined thickness may be a thickness according to which, when a first bonding agent after application G1, which is the bonding agent G having been applied onto the first joint surface Df, is brought into contact with a second bonding agent after application G2, which is the bonding agent G having been applied onto the second joint surface Ef, the contour of the portion of the first bonding agent after application G1 in contact with the second bonding agent after application G2 encompasses a first predetermined region of the first joint surface Df as the contour is projected onto the first joint surface Df, yet according to which the bonding agent G does not extend outwardly beyond the first joint surface Df; and a setting value of the second predetermined thickness may be a thickness according to which, when the second bonding agent after application G2 is brought into contact with the first bonding agent after application G1, the contour of the portion of the second bonding agent after application G2 in contact with the first bonding agent after application G1 encompasses a second predetermined region Eg (see, for example, FIG. 2C) of the second joint surface Ef as the contour is projected onto the second joint surface Ef, yet according to which the bonding agent G does not extend outwardly beyond the second joint surface Ef.

With this configuration, the joined member can be manufactured with a bonding agent having a predetermined thickness without the contours formed due to contact between the first and second bonding agents after application appearing in the first and second predetermined regions.

Further, the joined member manufacturing apparatus according to a seventeenth aspect may be, as shown in FIG. 1 for example, the above joined member manufacturing apparatus 100 according to the sixteenth aspect further including: a position confirmation device 40 configured to ascertain positions of the first and second bonding agents after application G1 and G2, where the controller 90 may allow the first and second bonding agents after application G1 and G2 to come into contact with each other after aligning the positions of the first and second bonding agents after application G1 and G2 using the position confirmation device 40.

With this configuration, the first and second members can be adhered to each other while in an appropriate positional relationship.

Further, the joined member manufacturing apparatus according to an eighteenth aspect may be, as shown in FIG. 1 for example, the above joined member manufacturing apparatus 100 according to the sixteenth or seventeenth aspect further including: a semi-cure device 45 configured to semi-cure the bonding agent G, where the controller 90 may allow the first and second bonding agents after application G1 and G2 to come into contact with each other after operating the semi-cure device 45 to semi-cure the first and second bonding agents after application G1 and G2.

With this configuration, it is possible to suppress a difference between the contour of the bonding agent at a portion where the bonding agent is in contact with the joint surface and the contour of the bonding agent at a portion where the bonding agent is in contact with the other bonding agent having been applied onto the other joint surface.

Further, the joined member manufacturing apparatus according to a nineteenth aspect may be, as shown in FIG. 1 for example, the above joined member manufacturing apparatus 100 according to any one of the sixteenth to eighteenth aspects further including: a chamber 51 configured to accommodate the first and second holding tools 20A and 20B; and a pressure reducing device 53 configured to reduce pressure inside the chamber 51 to achieve a predetermined degree of vacuum inside the chamber 51, where the controller 90 allows for the pressing of the first and second joint surfaces Df and Ef in the direction in which the first and second joint surfaces Df and Ef approach each other by allowing the first and second bonding agents after application G1 and G2 to come into contact with each other after having operated the pressure reducing device 53 and achieved the predetermined degree of vacuum inside the chamber 51 by reducing the pressure inside the chamber 51.

With this configuration, entrance of bubbles into the joined portion can be suppressed.

Effect of the Invention

According to the present invention, the distance between the ejection port forming groove and the outer edge of the first opposing face at the portion where the ejection port is formed is short; therefore, even in cases where a projection is present in the vicinity of the outer side of the application width of the applied material on the application target surface, the applied material can be applied without interference of the die head with the projection.

BRIEF DESCRIPTION OF DRAWINGS

FIG. 4A is a side view, FIG. 4B is a plan view of a first opposing face, and FIG. 4C is a partial enlarged view of an ejection port forming groove.

FIG. 5 is a flowchart illustrating steps for manufacturing a joined member.

DESCRIPTION OF EMBODIMENTS

Figure 1:
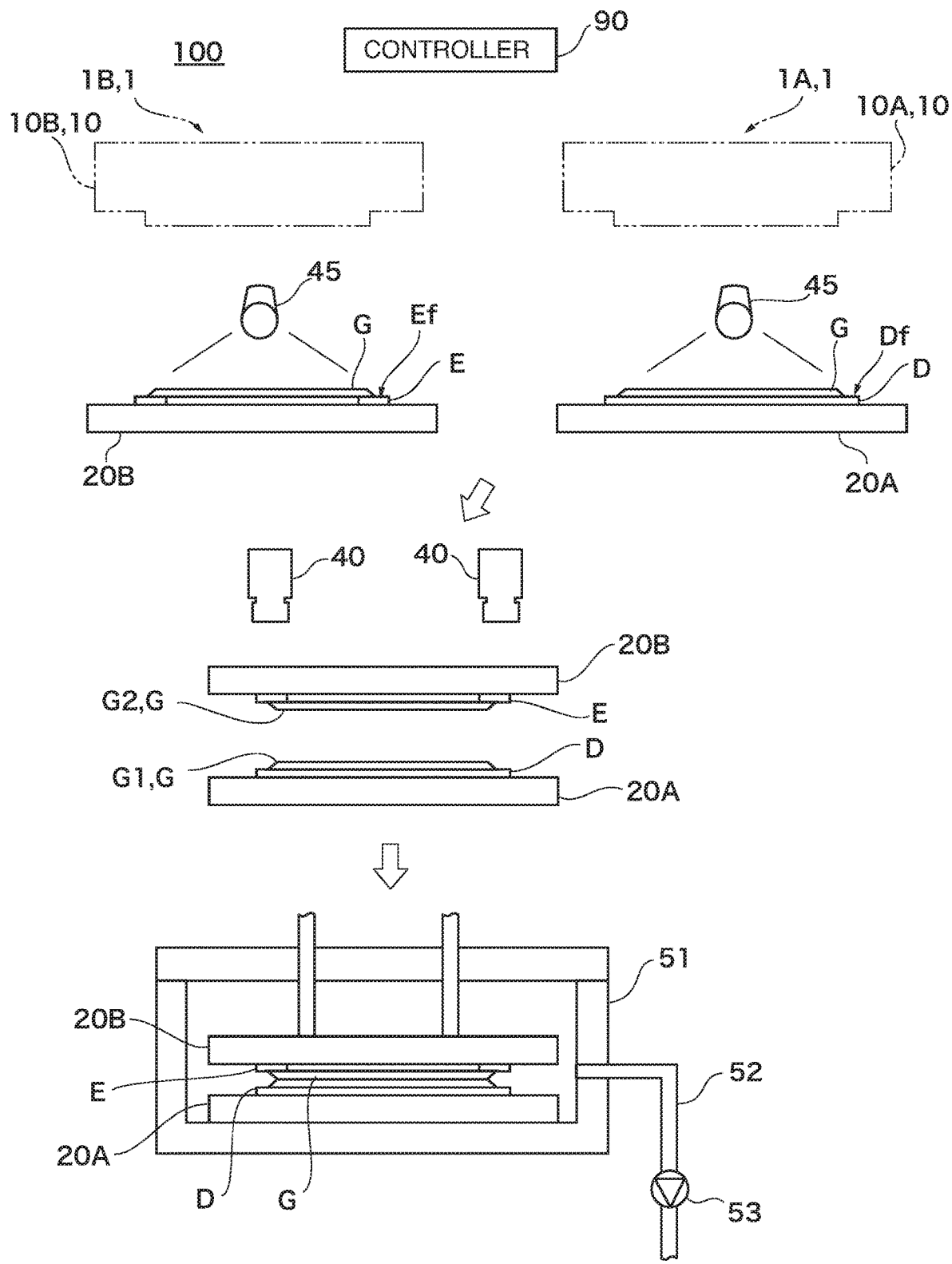
FIG. 1 is a conceptual diagram illustrating a schematic configuration of a joined member manufacturing apparatus according to an embodiment of the present invention.

This application is based on the Patent Application No. 2016-030110 filed on Feb. 19, 2016 in Japan and the Patent Application No. 2016-030111 filed on Feb. 19, 2016 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Description will hereinafter be made of an embodiment of the present invention with reference to the drawings. The same or corresponding members are denoted with the same reference numerals in all the drawings, and their descriptions are not repeated.

First, with reference to FIG. 1, a joined member manufacturing apparatus 100 according to an embodiment of the present invention will be described. FIG. 1 is a conceptual diagram illustrating a schematic configuration of the joined member manufacturing apparatus 100. The joined member manufacturing apparatus 100 is an apparatus for manufacturing a joined member, in which a first member (hereafter, "first member D") and a second member (hereafter, "second member E") are joined together through an adhesive G serving as a bonding agent. Now, before giving detailed description of the joined member manufacturing apparatus 100, illustrated will be an example configuration of a joined member which is manufactured by the joined member manufacturing apparatus 100.

Figure 2A:
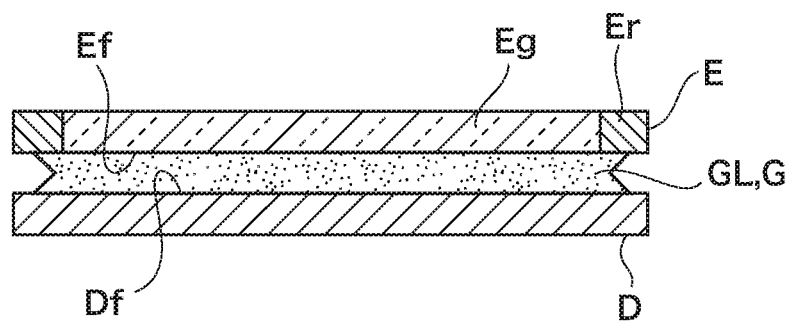
FIG. 2A is a cross-sectional diagram illustrating a configuration of a joined member.
Figure 2B:
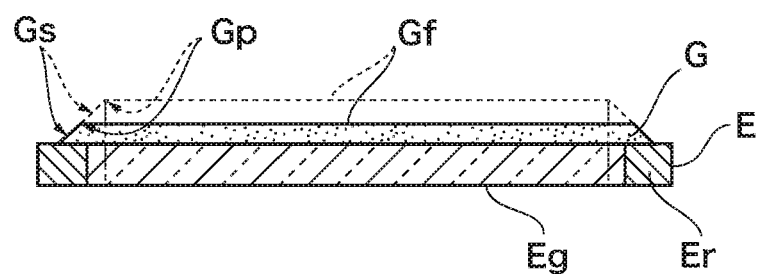
FIG. 2B is a cross-sectional diagram of a second member.
Figure 2C:
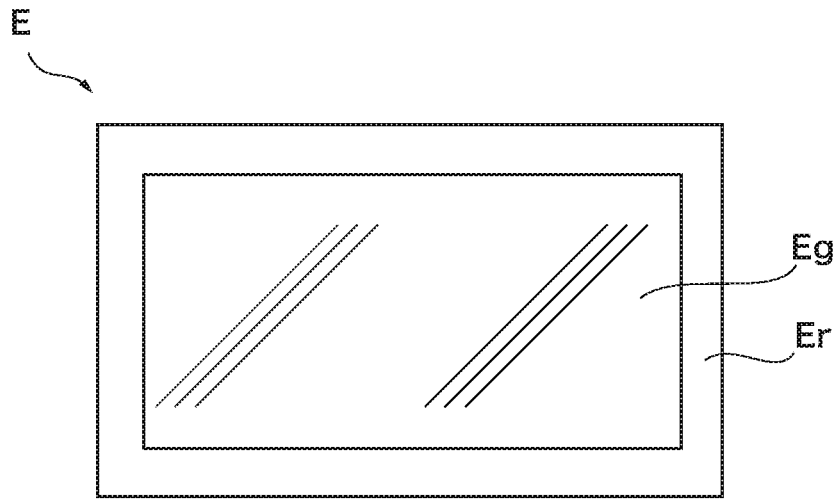
FIG. 2C is a plan view of the second member.

FIG. 2A is a cross-sectional diagram illustrating a configuration of a joined member C. FIG. 2B is a cross-sectional diagram illustrating a state where the adhesive G has been applied onto the second member E. FIG. 2C is a plan view of the second member E. The joined member C is a part which is constituted by the first member D, the second member E, and a layer made up of the adhesive G (adhesive layer GL) which is interposed between the first and second members D and E and has a predetermined thickness. In the present embodiment, description will be given on the assumption that the first member D is a liquid crystal module, which is formed to be plate-like, and the second member E is a cover glass serving to protect the liquid crystal. In the first member D, one surface of the plate-like part including the liquid crystal constitutes a first joint surface Df to be joined to the second member E through the adhesive G. In the present embodiment, the first joint surface Df of the first member D as well as a rear surface thereof on the opposite side from the first joint surface Df are formed to be flat. The second member E is configured such that the entire outer circumference of a rectangular glass plate Eg is enclosed by an outer frame Er. One surface of the second member E constitutes a second joint surface Ef to be joined to the first joint surface Df through the adhesive G. In the present embodiment, the second joint surface Ef of the second member E as well as a rear surface thereof on the opposite side from the second joint surface Ef are formed to be flat. In the present embodiment, the adhesive G is a resin which is in the state of a liquid having flowability and a predetermined viscosity when the adhesive G is applied to the first member D and/or the second member E, and exhibits adhesiveness when the adhesive G is cured by being irradiated with an ultraviolet ray. The adhesive layer GL is formed as a result of the adhesive G, which has flowability before the adhering of the first and second members D and E to each other, losing the flowability due to an increase in the viscosity. The adhesive layer GL serves to adhere the first and second members D and E and, when cured, also serves as an intermediate layer that maintains a distance between the first and second members D and E to be an appropriate distance. The thickness of the adhesive layer GL is a thickness that is required for the joined member C as a product and is determined in advance in accordance with the type of joined member C. The thickness of the adhesive layer GL is generally at least 100 µm, typically around 150 µm.

As illustrated in FIG. 2B, when applied on a member, the adhesive G assumes a trapezoidal shape in cross-section. FIG. 2B illustrates an example in which the adhesive G is applied onto the second member E, and here, a side Gs of the adhesive G applied onto the second joint surface Ef is inclined in a manner such that the outer edge of the adhesive G inclines further toward an inner side as the distance from the second joint surface Ef becomes greater. The degree of inclination of the side Gs (i.e., an angle that the side Gs forms with the normal of the second joint surface Ef) tends to decrease in conformity to an increase in thixotropy and viscosity as properties of the adhesive G, but since the thixotropy and/or viscosity are interrelated with workability of the adhesive G in terms of its application, it is difficult to increase the thixotropy and/or viscosity unconditionally. Thus, the degree of inclination of the side Gs is dependent on the property of the adhesive G. To cite examples of the adhesive G, transparent resins such as OCR and LOCA may be employed. The inclination of the side Gs remains constant even when the thickness of the applied adhesive G changes. Therefore, with an increase in the thickness of the applied adhesive G, a position of an intersection Gp between a surface Gf and the side Gs of the adhesive G, as projected onto the second joint surface Ef, may move from above the outer frame Er to above the glass plate Eg (see the adhesive G illustrated in FIG. 2B with the broken line). In a case where the intersection Gp projected onto the second joint surface Ef moves to above the glass plate Eg, the outer edge (contour) of the adhesive G is visible through the glass plate Eg when the joined member C is formed, resulting in degradation of appearance. In the present embodiment, in order to avoid such inconvenience, the adhesive G is applied onto both the first and second members D and E so that the adhesive G applied onto each member is not excessively thick.

Reference is made to FIG. 1 again to continue description of the joined member manufacturing apparatus 100. The joined member manufacturing apparatus 100 includes: an application device 1; a first suction stage 20A serving as a first holding tool for holding the first member D; a second suction stage 20B serving as a second holding tool for holding the second member E; a UV irradiator 45 serving as a semi-cure device; a chamber 51 in which the first and second members D and E are adhered to each other; and a controller 90. In the joined member manufacturing apparatus 100 in the present embodiment, the application device 1 includes a first application device 1A for applying the adhesive G onto the first member D and a second application device 1B for applying the adhesive G onto the second member E; the devices 1A and 1B are configured in the same way, so when a characteristic that is shared by both is described, these devices will be referred to collectively as an application device 1.

Figure 3:
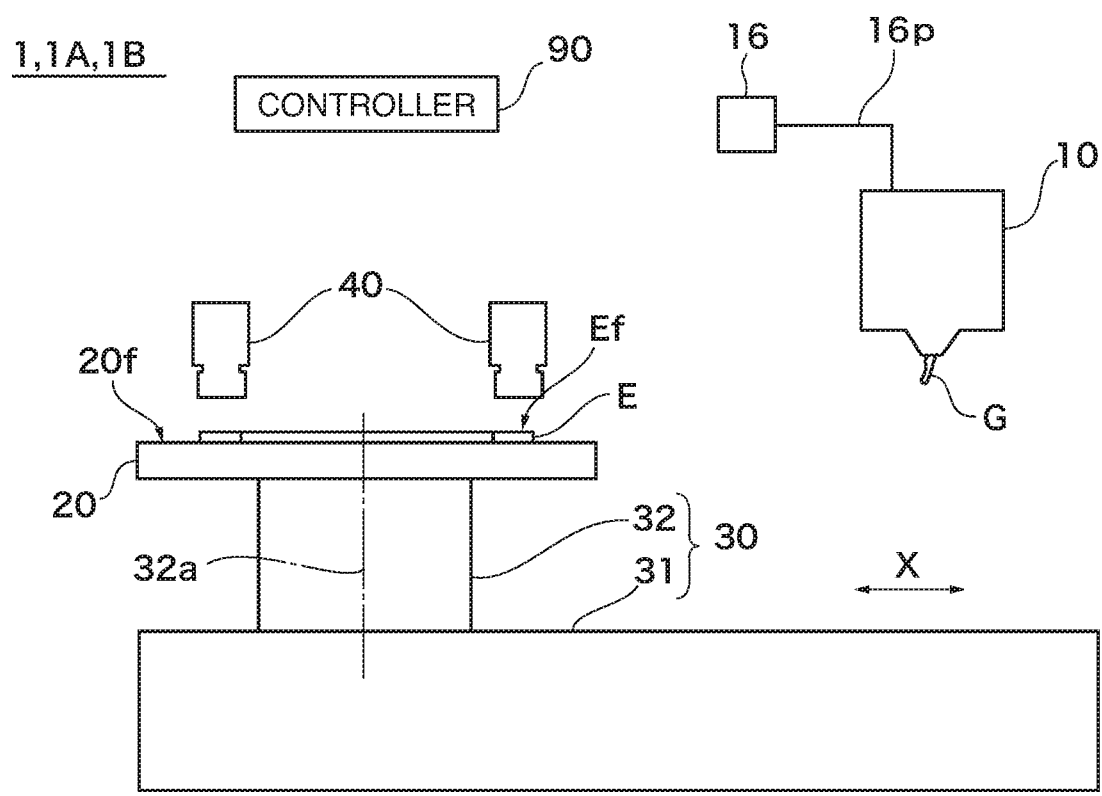
FIG. 3 is a side view illustrating a schematic configuration of an application device.

Now, with reference to FIG. 3, details of the application device 1 will be described. FIG. 3 is a side view illustrating a schematic configuration of the application device 1. The application device 1 is a device which applies the adhesive G onto the first member D or the second member E. In the present embodiment, each of the first and second members D and E corresponds to an application target member (a member onto which an applied material is applied) and the adhesive G corresponds to an applied material. Here, description will be given assuming a case where the application target member is the second member E and the adhesive G is applied onto the second member E. The application device 1 includes: a die head 10; an adhesive supply unit 16 for supplying the adhesive G to the die head 10; a placement table 20 on which the second member E is placed; a moving device 30 for moving the placement table 20 relative to the die head 10; a camera 40 serving as a position confirmation device for ascertaining a position of the second member E placed on the placement table 20; and the controller 90. While in the present embodiment the controller 90 that the application device 1 includes is the same controller 90 that the joined member manufacturing apparatus 100 (see FIG. 1) includes, it is also possible to provide each of the application device 1 and the joined member manufacturing apparatus 100 (see FIG. 1) with a separate controller.

Figure 4A:
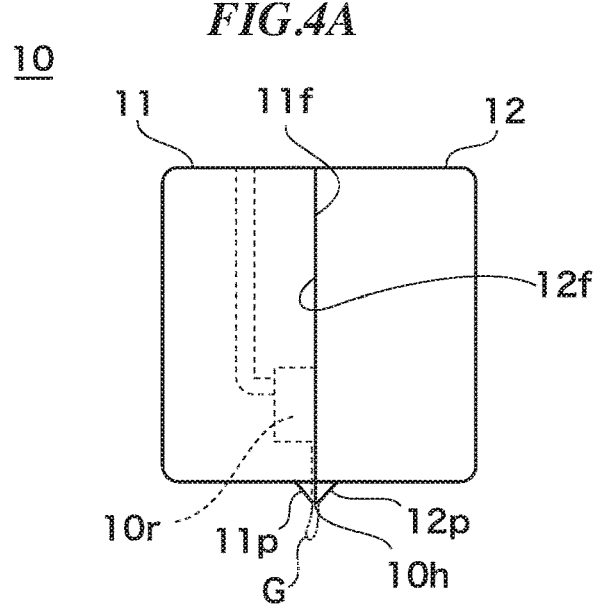
FIGS. 4A to 4C are diagrams illustrating a configuration of a die head, where
Figure 4B:
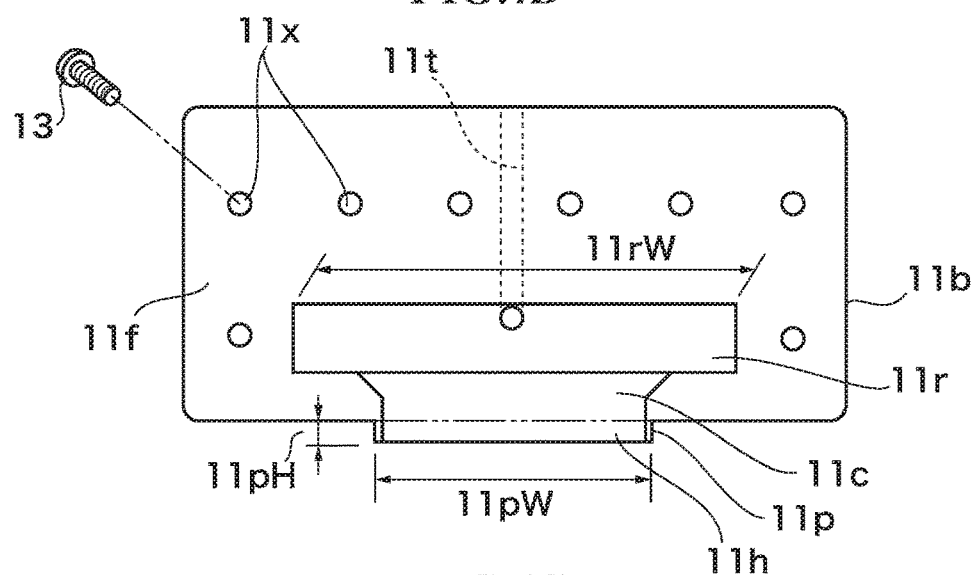
Figure 4C:
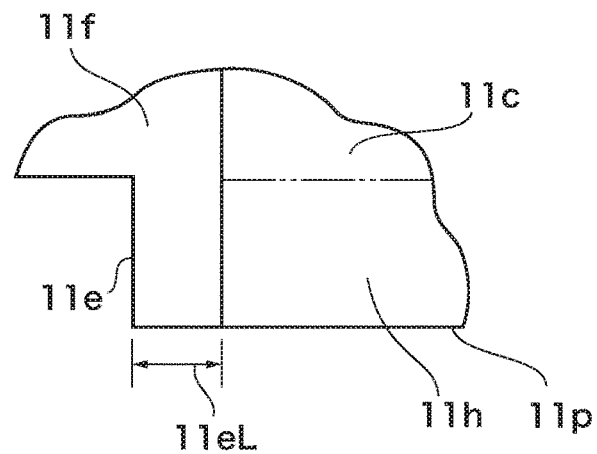

FIGS. 4A to 4C illustrate a structure of the die head 10. FIG. 4A is a side view of the die head 10. The die head 10 is configured to be dividable into a first head 11 and a second head 12. In the die head 10, a first opposing face of the first head 11 (hereafter, "first opposing face 11f") and a second opposing face of the second head 12 (hereafter, "second opposing face 12f") opposing each other are brought into contact with each other to be coupled together. The first head 11 corresponds to a first head constituting member and the second head 12 corresponds to a second head constituting member. The die head 10 is not provided with a shim plate for adjusting an application width of the adhesive G. By not providing a shim plate, a configuration around an ejection port 10h can be simplified. The die head 10 is formed to have a shape that is substantially an elongated cuboid shape. In the die head 10, one face from among the plurality of faces of the cuboid has a protruding part formed thereon, and the ejection port 10h is formed on a tip end of the protruding part. This protrusion, onto the tip end of which the ejection port 10h is formed, is formed on a central part of one of rectangular faces on which the boundary between the first and second heads 11 and 12 appears. The ejection port 10h extends in the longitudinal direction of the cuboid along the boundary between the first and second heads 11 and 12. The ejection port 10h is a narrow, elongated opening (slit) through which the adhesive G is ejected to outside the die head 10. The die head 10 also has a reservoir 10r, which is formed in the interior of the die head 10 and serves to temporarily hold the adhesive G inside the die head 10.

FIG. 4B is a diagram illustrating the first opposing face 11f of the first head 11. In the present embodiment, the first opposing face 11f is formed to be substantially rectangular and has a first protrusion 11p that is formed in the central part of one of the long sides of the rectangle so as to protrude to outside the rectangle. The substantially rectangular part of the first opposing face 11f will be referred to as a first main part 11b below for convenience of explanation. Thus, the first opposing face 11f includes the first main part 11b and the first protrusion 11p. A height 11pH by which the first protrusion 11p protrudes is a height which enables avoidance of a projection that may be present on an outer side of the application width with which the adhesive G is applied onto the second member E, and from the viewpoint of enabling avoidance of a greater variety of projections, the height may be set to 3 mm or higher, preferably 4 mm or higher, more preferably 5 mm or higher, and from the viewpoint of limiting pressure applied onto the first protrusion 11p during ejection of the adhesive G, may be set to 8 mm or lower, preferably 7 mm or lower, more preferably 6 mm or lower. A width 11pW of the first protrusion 11p substantially coincides with the application width with which the adhesive G is applied onto the second member E.

In the present embodiment, the width 11pW is smaller than the length of the long side of the rectangle of the first main part 11b and is roughly 0.4 times the length of the long side, but may be about 0.3 to 0.5 times or 0.6 times the same. The first opposing face 11f has formed therein: an ejection port forming groove 11h for forming the ejection port 10h; a reservoir forming groove 11r for forming the reservoir 10r; and a communication part forming groove 11c through which the ejection port forming groove 11h and the reservoir forming groove 11r communicate with each other. These grooves 11h, 11r, and 11c are formed by being grooved into the first opposing face 11f toward the face on the reverse side.

The ejection port forming groove 11h is formed over the entirety of the first protrusion 11p except for both ends of the first protrusion 11p in the longitudinal direction. As illustrated in the partial enlarged view in FIG. 4C, a distance 11eL (hereafter, "end portion thickness 11eL") between the ejection port forming groove 11h and a first outer edge 11e of the first protrusion 11p at the tip end of the first protrusion 11p (the portion where the ejection port 10h is formed) is 0.1 mm to 1.0 mm. The contour of the ejection port forming groove 11h along the first outer edge 11e may project slightly (roughly about 30% to 50% of the end portion thickness 11eL) to an inner side in the longitudinal direction toward the first main part 11b. A depth of the ejection port forming groove 11h (the distance from the first opposing face 11f in the direction towards the reverse side thereof) is small (shallow) because of the construction of the first protrusion 11p, and may be decided taking account of the thickness of the adhesive G to be applied onto the second member E, a movement speed of the die head 10 relative to the second member E, etc. As illustrated in FIG. 4B, the reservoir forming groove 11r is formed in one of regions that are obtained by imaginarily trisecting the first main part 11b in the direction in which a short side of the first main part 11b extends, and the region in which the reservoir forming groove 11r is formed while being separated from the first protrusion 11p is the one closest to the first protrusion 11p. A length 11rW of the reservoir forming groove 11r in the longitudinal direction is typically larger than the width 11pW of the first protrusion 11p where the ejection port forming groove 11h is formed, and in the present embodiment, the length 11rW is roughly two thirds of the length of the first main part 11b in the longitudinal direction. The communication part forming groove 11c reaches the reservoir forming groove 11r while a width thereof remains substantially the same as a width of the ejection port forming groove 11h, but for the purpose of smoothing the flow of the adhesive G from the reservoir forming groove 11r toward the ejection port forming groove 11h, the width of the communication part forming groove 11c may be increased in the vicinity of the reservoir forming groove 11r. In the present embodiment, a depth of the communication part forming groove 11c is the same as the depth of the ejection port forming groove 11h, and a depth of the reservoir forming groove 11r is larger than the depth of the ejection port forming groove 11h. A loading flow path 11t for guiding the adhesive G from outside the die head 10 to the reservoir 10r is formed in the first head 11 on the opposite side from the communication part forming groove 11c relative to the reservoir forming groove 11r. The loading flow path 11t typically does not appear on the first opposing face 11f. The loading flow path 11t penetrates into the interior of the first head 11 from one face of the first head 11 and reaches the reservoir forming groove 11r.

A contour of the second opposing face 12f of the second head 12 is typically formed to be congruent with the first opposing face 11f, but may also have a different shape to the first opposing face 11f. In the present embodiment, although the contour of the second opposing face 12f is formed to be congruent with the first opposing face 11f, the second opposing face 12f is formed to be flat without having any grooves corresponding to the ejection port forming groove 11h, the reservoir forming groove 11r, and the communication part forming groove 11c that are formed in the first opposing face 11f. However, it is also possible to form one or more grooves corresponding to the grooves 11h, 11r, and 11c in the second opposing face 12f as well. A second protrusion 12p corresponding to the first protrusion 11p of the first head 11 is formed in the second head 12. A height and width of the second protrusion 12p are equivalent to those of the first protrusion 11p. The first and second heads 11 and 12 are secured to each other with fastening bolts 13. In the present embodiment, bolt through-holes 11x, which are pierced through from the first opposing face 11f to the reverse side thereof, are formed in the first head 11, and in the second opposing face 12f, screw threads (not illustrated) into which the bolts 13 are screwed are formed at locations that coincide with the bolt through-holes 11x when the second opposing face 12f opposes the first opposing face 11f. In the present embodiment, the bolt through-holes 11x formed in the first opposing face 11f are disposed around three sides of the rectangular reservoir forming groove 11r that are exclusive of the side thereof closer to the communication part forming groove 11c. Such disposition of the bolt through-holes 11x enables firm coupling of the first and second heads 11 and 12 so that separation of the first and second heads 11 and 12 can be suppressed even in cases where internal pressure of the grooves 11h, 11r, and 11c through which the adhesive G flows increases when the adhesive G is ejected.

Reference is made to FIG. 3 again to continue description of the application device 1. In the following description of the application device 1, FIGS. 4A to 4C will be referenced as appropriate when the configuration of the die head 10 is described. The adhesive supply unit 16 includes an adhesive tank (not illustrated) for storing the adhesive G. The adhesive supply unit 16 also includes a pressure-feeding device (not illustrated) for pressure-feeding the stored adhesive G toward the die head 10. A pump may be used as the pressure-feeding device. The pressure-feeding device included in the adhesive supply unit 16 is configured such that an ejection flow rate of the adhesive G can be varied by varying the ejection pressure of ejecting the adhesive G. Note, however, that a configuration may instead be adopted in which the ejection pressure of the adhesive G is varied not by the pump but by use of atmospheric pressure. The adhesive supply unit 16 is connected to the die head 10 via an adhesive flow path 16p and is configured to be able to supply the adhesive G to the die head 10 via the adhesive flow path 16p.

The placement table 20 is a table on which the second member E is placed when the adhesive G is applied onto the second member E. In a plan view, the placement table 20 typically has a size which enables the placement table 20 to encompass the second member E. The placement table 20 is formed to be plate-like. A face of the placement table 20 on which the second member E is placed constitutes a placement face 20f. The placement face 20f has a shape that conforms to a shape of the second member E to be placed, and in the present embodiment, the placement face 20f is formed to be a flat face. The placement table 20 is typically disposed in a manner in which the placement face 20f is facing upwards and horizontal.

The moving device 30 is a device for moving the placement table 20 relative to the die head 10, and in the present embodiment, is a device which moves the placement table 20 relative to the die head 10 having a fixed position. The moving device 30 includes a conveyance device 31 and an adjustment device 32. The adjustment device 32 is disposed on the upper side of the conveyance device 31, and the placement table 20 is attached to the upper side of the adjustment device 32. The conveyance device 31 is configured so as to be able to reciprocally move the placement table 20, which is attached thereto via the adjustment device 32, in a direction (hereafter, "X direction") that is horizontally perpendicular to a direction in which the ejection port 10h of the die head 10 extends. The adjustment device 32 is configured so as to be able to reciprocally move the placement table 20 in the vertical direction and the direction in which the ejection port 10h of the die head 10 extends (a direction that is horizontally perpendicular to the X direction), as well as to be able to rotate the placement table 20 about an imaginary axis 32a extending vertically through the centroid of the placement table 20.

The camera 40 is disposed above a standby position of the placement table 20 on which the second member E prior to receiving application of the adhesive G is placed, the standby position being apart from the die head 10 in the X direction. In the present embodiment in which the second joint surface Ef (corresponding to an application target surface) which is a face of the second member E onto which the adhesive G is to be applied is rectangular, two cameras 40 are provided so that corners at two locations (corresponding to opposite corners) of the second member E placed on the placement table 20 can be recognized. The number of cameras 40, however, may be any provided that the relative position of the second member E placed on the placement table 20 to the die head 10 can be ascertained.

The controller 90 is equipment which manages operations of the application device 1. The controller 90 is connected to the moving device 30 through a signal cable (not illustrated) and is configured to be able to allow movement of the placement table 20 in the horizontal and vertical directions as well as to allow rotation of the placement table 20 about the imaginary axis 32a. The controller 90 causes the moving device 30 to operate while ascertaining the position of the second member E placed on the placement table 20, so is able to allow movement of the placement table 20 such that a predetermined position of the second joint surface Ef of the second member E meets a reference position of the die head 10. The predetermined position of the second joint surface Ef is typically the centroid of the second joint surface Ef. The reference position of the die head 10 is typically the center of the elongated ejection port 10h (center of the application width). That the predetermined position meets the reference position means a state where the two positions are located on the same imaginary vertical plane. The controller 90 is also connected to the adhesive supply unit 16 through a signal cable (not illustrated) and is configured to be able to control supply and shutoff of the adhesive G from the adhesive supply unit 16 to the die head 10 and adjust a supply flow rate of the adhesive G. The controller 90 is also connected to the camera 40 through a signal cable (not illustrated) and is configured to be able to acquire positional information obtained at the camera 40.

Reference is made to FIG. 1 again to describe a configuration of the joined member manufacturing apparatus 100 other than the application device 1 described above. The first suction stage 20A typically has a size which enables the first suction stage 20A to encompass the first member D and is formed to be plate-like. A plurality of suction holes (not illustrated) are formed in the first suction stage 20A in a region that is covered by the first member D when the first member D is placed on the first suction stage 20A, so that the first suction stage 20A can hold the first member D placed thereon by suction force (hereafter, "suction-holding"). The suction holes (not illustrated) are in connection with a flow path in which a vacuum pump (not illustrated) is provided and allow for suction-holding of the first member D by negative pressure.

The second suction stage 20B typically has a size which enables the second suction stage 20B to encompass the second member E and is formed to be plate-like. A plurality of suction holes (not illustrated) are formed in the second suction stage 20B in a region that is covered by the second member E when the second member E is placed on the second suction stage 20B, so that the second suction stage 20B can suction-hold the second member E placed thereon. These suction holes (not illustrated) are in connection with a flow path in which a vacuum pump (not illustrated) is provided and allow for suction-holding of the second member E by negative pressure. In addition to being configured in an equivalent manner to the first suction stage 20A described above, the second suction stage 20B is also configured to be reversible. In other words, the second suction stage 20B is configured such that the face on which the second member E is placed can be switched between the upper face in the vertical direction and the lower face in the vertical direction. Note, however, that instead of configuring the second suction stage 20B itself to be reversible, it is also possible to provide the application device 1 with a reversing mechanism (turnover machine) for reversing the second member E onto which the adhesive G has been applied separately from the second suction stage 20B such that the second suction stage 20B is disposed opposing the first suction stage 20A so as to be able to suction the second member E having been reversed.

The UV irradiator 45 is equipment which radiates an ultraviolet ray. The UV irradiator 45 is provided for the purpose of, through radiation of an ultraviolet ray toward the adhesive G, making the adhesive G lose its flowability so as to cause an increase in the viscosity thereof. The UV irradiator 45 is configured such that the intensity of the radiated ultraviolet ray and/or the duration of the radiation of the ultraviolet ray can be adjusted so that viscosity (degree of curing) of the adhesive G irradiated with the ultraviolet ray can be adjusted. In the present embodiment, one UV irradiator 45 is disposed above the first suction stage 20A and another UV irradiator 45 is disposed above the second suction stage 20B, but it is also possible to provide a single UV irradiator 45 which radiates an ultraviolet ray onto both the adhesive G applied onto the first member D and the adhesive G applied onto the second member E.

The chamber 51 is formed into a size that enables the chamber 51 to accommodate the first suction stage 20A and the second suction stage 20B at the same time. The chamber 51 is configured to be openable/closable so that the first member D suction-held on the first suction stage 20A and the second member E suction-held on the second suction stage 20B can be placed in and taken out of the chamber 51. A suction tube 52 is connected to the chamber 51. A vacuum pump 53 serving as a pressure reducing device is provided on the suction tube 52. The chamber 51 is configured such that the degree of vacuum inside the chamber 51 can be adjusted through operation of the vacuum pump 53.

The controller 90, which is shared with the application device 1, not only has the aforementioned function of managing operations of the application device 1 but is also configured to manage other operations of the joined member manufacturing apparatus 100 than those of the application device 1. The controller 90 is connected to the first and second suction stages 20A and 20B through signal cables (not illustrated) and is configured so as to be able to switch between holding and releasing the first and second members D and E and also to reverse the second suction stage 20B (or the reversing mechanism in the case where a reversing mechanism is additionally provided). The controller 90 is also connected to the UV irradiator(s) 45 through signal cable(s) (not illustrated) and configured to be able to the intensity and duration of the irradiation of the ultraviolet ray. The controller 90 is also connected to the chamber 51 and the vacuum pump 53 through signal cables (not illustrated) and configured to be able to control opening and closing of the chamber 51 and an operational state (start and stop) of the vacuum pump 53. Note that in the present embodiment, the cameras 40 of the application device 1 are also used in aligning positions of the first and second members D and E when the first and second members D and E are adhered to each other inside the joined member manufacturing apparatus 100 portion but outside the application device 1.

Next, with reference to FIG. 5, a method for manufacturing a joined member according to an embodiment of the present invention will be described. FIG. 5 is a flowchart illustrating steps for manufacturing the joined member C. The method for manufacturing a joined member (method for manufacturing the joined member C) described below is typically performed using the joined member manufacturing apparatus 100 that has been described so far, but may also be performed in a different manner to using the joined member manufacturing apparatus 100. The description of the method for manufacturing the joined member C below also serves to describe operation of the joined member manufacturing apparatus 100. In the description of the method for manufacturing the joined member C below, reference will be made to FIGS. 1 to 4C, as appropriate, when mention is made of a configuration of the joined member manufacturing apparatus 100 provided with the application device 1 including the die head 10 or a configuration of the joined member C.

Upon commencement of the manufacture of the joined member C, first, the first member D is placed onto the placement table 20 of the first application device 1A with the first joint surface Df facing upwards (placing step: S1). The placement of the first member D onto the placement table 20 may be performed manually by a human or may be performed by a robot hand (not illustrated) being controlled by the controller 90. Once the first member D is placed on the placement table 20, the controller 90 operates the moving device 30 so as to move the placement table 20 and, when the first member D has reached a predetermined position relative to the die head 10, allows the adhesive G in a liquid state to be ejected through the ejection port 10h so that the adhesive G is applied onto the first joint surface Df (first applying step: S2). The first joint surface Df corresponds to an application target surface. When allowing the adhesive G to be applied onto the first joint surface Df, the controller 90 confirms the position of the first member D on the placement table 20 using the camera 40, and adjusts the position of the placement table 20 such that, when the placement table 20 is moved in the X direction (see FIG. 3), the adhesive G ejected through the ejection port 10h is applied onto an intended position on the first joint surface Df. Moreover, in order for the thickness of the adhesive G having been applied onto the first joint surface Df (hereafter, "first adhesive after application G1") to be a first predetermined thickness, the controller 90 adjusts the ejection pressure of the adhesive G on the basis of the size of the ejection port 10h formed in the die head 10. The first predetermined thickness will be described later.

In the die head 10, the end portion thickness 11eL (see FIG. 4C) is 0.1 mm to 1.0 mm, and thus, when applying the adhesive G onto the first joint surface Df, even if a protruding object is present immediately outside (outside in the direction perpendicular to the X direction) the region of the first joint surface Df on which the adhesive G is applied, it is possible to prevent the die head 10 from interfering with the protruding object. As examples of the protruding object, the matters listed below can be cited in addition to protruding parts that are physically existent as the structure of the first member D.

Figure 6A:
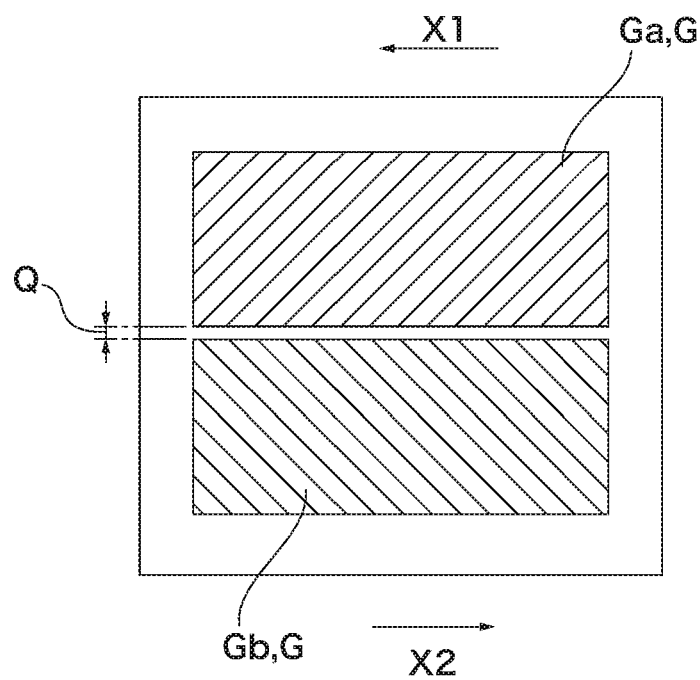
FIG. 6A is a plan view illustrating a modification of a manner of applying an adhesive.

FIG. 6A is a plan view illustrating a modification of the manner of applying the adhesive G. In the modification illustrated in FIG. 6A, an area of a member over which the adhesive G is applied is wide and the width with which the adhesive G is applied is about double the width 11pW of the first protrusion 11p of the die head 10. In this case, the die head 10 is aligned with one side of the application width of the adhesive G and in this state the adhesive G is applied in the X1 direction in the drawing (the resultant of this application may be referred to as a "first adhesive film Ga"), and when the application over an intended length in the X1 direction (first predetermined length) is completed (first applied film forming step), the die head is moved in the application width direction (die head moving step), whereafter the adhesive G is applied in the X2 direction in the drawing (the resultant of this application may be referred to as a "second adhesive film Gb"), and by completing the application over an intended length in the X2 direction (second predetermined length) (second applied film forming step), the adhesive G can be applied over the entirety of an intended portion. Note that while in the present modification the first and second predetermined lengths are the same length, these lengths may be different lengths. When the first and second adhesive films Ga and Gb are formed in this manner, if a conventional die head is used which has a shim plate and the width of which projects further in the application width direction than the ejection port (a die head, the width of which is larger than the application width) and it is intended to eliminate a gap between the adhesive G applied in the X1 direction (first adhesive film Ga) and the adhesive G applied in the X2 direction (second adhesive film Gb), then the portion of the die head that projects in the application width direction scrapes off from the surface layer of the already-applied adhesive G (first adhesive film Ga) when the adhesive G is applied in the X2 direction, so it is not possible to equalize the thickness of the adhesive G applied in the X1 direction (first adhesive film Ga) and the thickness of the adhesive G applied in the X2 direction (second adhesive film Gb).

Figure 6B:
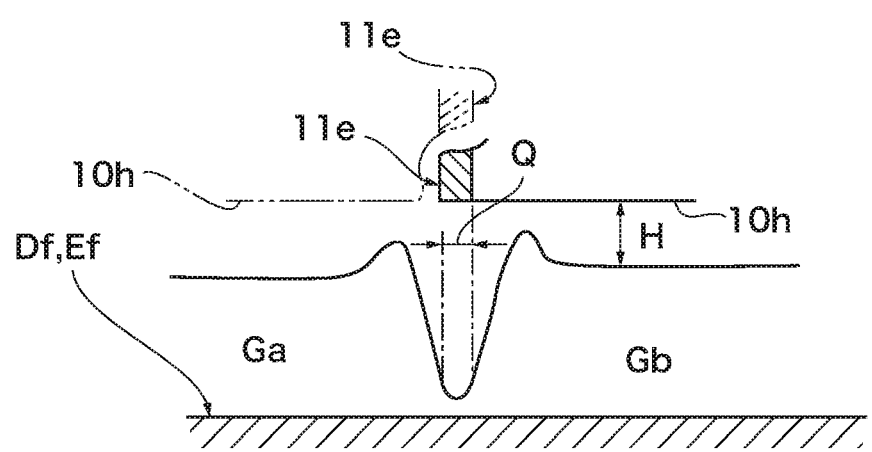
FIG. 6B is a vertical partial cross-section.

This flaw will be described in more detail. When the die head 10 applies the adhesive G in order to form each of the first and second adhesive films Ga and Gb, the ends of the application widths of the first and second adhesive films Ga and Gb usually swell up as illustrated in the vertical partial cross-section in FIG. 6B (FIG. 6B illustrates one end of each of the first and second adhesive films Ga and Gb). Thus, when applying the adhesive G, it is usually preferred that the tip end of the die head 10 be positioned higher than the height of the surface of the adhesive G having been applied (height of the applied adhesive G at a portion that is further on an inner side than the swelling portion and that is a step lower than the swelling portion). However, if the die head 10 is separated too distantly from the application target surface (the first joint surface Df or the second joint surface Ef) when applying the adhesive G, the edge of the film formed of the adhesive G having been applied (side formed along the track of the applications width) ends up being wavy (becomes jagged). Thus, when applying the adhesive G, it is preferred that a distance H between the tip end of the die head 10 and the surface of the film formed of the adhesive G having been applied (a flat surface that is located further on an inner side than the edge and is lower than the swelling portion) be less than or equal to a predetermined distance (for example, 30 µm). From the viewpoint of making the film thickness controllable, it is preferred that the distance H be greater than or equal to 0 µm so that the distance H is not a negative value (a state where the tip end of the die head 10 is closer to the application target surface than the surface of the adhesive film). Here, a case is assumed in which the tip end of the die head 10 is brought close to a height, which the surface of the film after application of the adhesive G would assume, so that the edge of the film of the applied adhesive G does not become wavy. In this case, when the second adhesive film Gb is formed at a favorable distance Q to the first adhesive film Ga, if a conventional die head having a shim plate (die head with a large end portion thickness) is used, the tip end of the die head overlaps the first adhesive film Ga from above so that the first adhesive film Ga makes contact with the die head due to surface tension, resulting in the die head scraping off a portion of the first adhesive film Ga. In this regard, the die head 10 according to the present embodiment is formed such that the end portion thickness 11eL (see FIG. 4C) is 0.1 mm to 1.0 mm; thus, even when the adhesive G is applied to form a plurality of rows and the distance Q is set to 2 mm or smaller so that there is practically no gap between the rows, scraping off from the surface layer of the already-applied adhesive G is avoided substantially and the adhesive G can be applied uniformly. The distance Q is a distance (shortest distance) between the track of the ejection port 10h of the die head 10 when forming the first adhesive film Ga and the track of the ejection port 10h of the die head 10 when forming the second adhesive film Gb. The distance Q may be set to be larger than the end portion thickness 11eL from the viewpoint of reducing the probability of the die head 10 contacting the applied adhesive G. In a case where the second adhesive film Gb is formed adjacently to the first adhesive film Ga as in the present modification, it is preferable to set the distance Q to 1 mm or smaller from the viewpoint of suppressing occurrence of a site where the adhesive G is discontinuous in the formed joined member C (see FIGS. 2A to 2C). When the distance Q is 2 mm or smaller, then even if a gap is formed between the surface of the first adhesive film Ga and the surface of the second adhesive film Gb, the first adhesive film G1 and the second adhesive film G2 usually overlap each other near the application target surface and become continuous, so the boundary between the two will not be present on the application target surface. Moreover, if it is immediately after the formation of the second adhesive film G2, then even if a gap has been formed between the surface of the first adhesive film Ga and the surface of the second adhesive film Gb, leaving the applied adhesive G to stand for a predetermined time period (standing step) allows the adhesive G used in the present embodiment, which has a predetermined viscosity (generally 1000 to 2000 mPa·s), to exhibit its flowability so that the swelling portions on both ends of the application width disappear and the gap between the surfaces of both adhesive films Ga and Gb becomes closed, whereby a flat surface is formed. The predetermined time period is determined in accordance with a viscosity of the adhesive G, and when the adhesive G having the predetermined viscosity according to the present embodiment is used, the predetermined time period is about 1 to 2 minutes or 2 to 3 minutes or 3 to 5 minutes. Note that the distance Q may also be adjusted in accordance with the thickness (film thickness) of the first adhesive film Ga and the second adhesive film Gb. Further, the tip end of the die head 10 and the application target surface are typically maintained to be parallel with each other during application of the adhesive G, but in a case where the two cannot be parallel, the distance H between the tip end of the die head 10 and the surface of the first adhesive film Ga or the surface of the second adhesive film Gb may be set such that the distance H is less than or equal to a predetermined distance (for example, 30 µm) at the site where the distance H is greatest.

Note that as illustrated in FIGS. 6A and 6B, when the second adhesive film Gb is applied adjacently to the first adhesive film Ga, the die head 10 is typically disposed in such a manner that the direction in which the ejection port 10h of the die head 10 is elongated is perpendicular to the directions X1 and X2 in which the adhesive G is applied; however, the die head 10 may be disposed in such a manner that the direction in which the ejection port 10h of the die head 10 is elongated forms an angle with the directions X1 and X2 that is other than a right angle. Further, when moving the die head 10 in the application width direction after formation of the first adhesive film Ga (when performing the die head moving step), it is possible to stop ejection of the adhesive G through the ejection port 10h after completion of the first applied film forming step and move the die head 10 in the direction X1 for an appropriate time period with the ejection being stopped, and then perform the die head moving step, whereafter the die head 10 is moved in the direction X2 with the ejection of the adhesive G through the ejection port 10h being stopped, and when the die head 10 reaches an appropriate position, the ejection of the adhesive G through the ejection port 10h is started to perform the second applied film forming step. In the die head moving step, the die head 10 is typically moved in a direction perpendicular of the directions X1 and X2, but may also be moved in a direction that does not form a right angle with the directions X1 and X2. Note that in the case where the die head 10 is disposed such that the direction in which the ejection port 10h of the die head 10 is elongated is perpendicular to the directions X1 and X2, moving the die head 10 in a direction perpendicular to the directions X1 and X2 in the die head moving step is equivalent to moving the die head 10 in the direction in which the ejection port 10h is elongated.

Reference is made mainly to FIG. 5 again to continue description of the method for manufacturing the joined member C. Once the adhesive G is applied onto the first joint surface Df, the first member D is moved from the placement table 20 to the first suction stage 20A, and the first suction stage 20A is caused to suction-hold the first member D (S3). The first member D may be moved to the first suction stage 20A manually by a human or by a robot hand (not illustrated) being controlled by the controller 90. Once the first member D is moved to the first suction stage 20A, the second member E is placed onto the placement table 20 of the second application device 1B with the second joint surface Ef facing upwards (placing step: S4). The placement of the second member E onto the placement table 20 is typically performed in substantially the same manner as the placement of the first member D onto the placement table 20. Once the second member E is placed on the placement table 20, with controlling by the controller 90, the adhesive G is applied onto the second joint surface Ef typically in substantially the same manner as when the adhesive G is applied onto the first joint surface Df (second applying step: S5). At this time, the controller 90 adjusts the ejection pressure of the adhesive G on the basis of the size of the ejection port 10h formed in the die head 10 so that the thickness of the adhesive G having been applied onto the second joint surface Ef (hereafter, "second adhesive after application G2") is a second predetermined thickness.

Now, the first predetermined thickness mentioned earlier and the second predetermined thickness mentioned above will be described. As described earlier, the side Gs inclines when the adhesive G is applied onto a member (see FIG. 2B), so the intersection Gp between the surface Gf and the side Gs of the adhesive G is located further on an inner side in conformity to an increase in the thickness of the adhesive G. When the mutually opposing first and second adhesives after application G1 and G2 are brought into contact with each other in a later step, the respective intersections Gp of the adhesives G that are located on an inner side appear as contours. In the present embodiment, it is intended that the contours fall within the range of the outer frame Er of the second member E so that the contours are not visible through the glass plate Eg that is located on an inner side of the outer frame Er. Meanwhile, even if the area of the portion of the adhesive G that is in contact with a member is intended to be widened in order to move the intersection Gp further toward the outer side, it is not realistic to widen the area to extend beyond the outer edges of the members D and E. In view of these circumstances, the first predetermined thickness is a thickness according to which the contour formed due to continuation of the intersection Gp of the first adhesive after application G1 encompasses the outer circumference of the glass plate Eg when making contact with the second adhesive after application G2 (encompasses the glass plate Eg entirely) yet the first adhesive after application G1 does not extend outwardly beyond the first joint surface Df. The second predetermined thickness is a thickness according to which the contour formed due to continuation of the intersection Gp of the second adhesive after application G2 encompasses the outer circumference of the glass plate Eg when making contact with the first adhesive after application G1 yet the second adhesive after application G2 does not extend outwardly beyond the second joint surface Ef. In the present embodiment, each of the first and second predetermined thicknesses are half the thickness that is determined in advance as the thickness of the adhesive layer GL of the joined member C. Note that in the present embodiment, the outer circumference of the glass plate Eg (boundary between the glass plate Eg and the outer frame Er) corresponds to each of the first predetermined region and the second predetermined region.

Once the adhesive G is applied onto the second joint surface Ef, the second member E is moved from the placement table 20 to the second suction stage 20B and the second suction stage 20B is caused to suction-hold the second member E (S6). The second member E may be moved to the second suction stage 20B manually by a human or by a robot hand (not illustrated) being controlled by the controller 90. In a case where the second suction stage 20B is disposed so as to oppose the first suction stage 20A without itself being reversed, a configuration may be adopted in which a robot hand (not illustrated) functions as the reversing mechanism. Once the second member E is moved to the second suction stage 20B, the UV irradiator 45 is used to radiate an ultraviolet ray onto the first adhesive after application G1 so as to semi-cure the first adhesive after application G1 (first semi-curing step: S7), and the UV irradiator 45 is used to radiate an ultraviolet ray onto the second adhesive after application G2 so as to semi-cure the second adhesive after application G2 (second semi-curing step: S8). The "semi-curing" as referred to herein means to increase the viscosity to such a degree that, while it is still possible for the first and second adhesives after application G1 and G2 to be joined together when brought into contact with each other, the adhesives G applied onto the member D and E do not flow (do not deform) even when the members D and E are tilted or reversed. The first semi-curing step (S7) and the second semi-curing step (S8) may be performed in parallel, or the order may be reversed. Note that while for the sake of convenience, FIG. 5 illustrates a case where the first semi-curing step (S7) is performed after the step of suction-holding the second member E (S6), the first semi-curing step (S7) may be performed at an appropriate timing after the step of suction-holding the first member D (S3) without waiting for the completion of the step of suction-holding the second member E (S6). Further, in a case where the first and second members D and E are processed at different sites as in the present embodiment, the steps from the step of placing the first member D (S1) to the step of suction-holding the first member D (S3) (plus the first semi-curing step (S7)) and the steps from the step of placing the second member E (S4) to the step of suction-holding the second member E (S6) (plus the second semi-curing step (S8)) may be performed in parallel.

Next, using the camera 40 for confirmation, the controller 90 adjusts the disposition of the first member D being suction-held by the first suction stage 20A (first disposition adjusting step: S9) and adjusts the disposition of the second member E being suction-held by the second suction stage 20B (second disposition adjusting step: S10). In the present embodiment, the dispositions of the first and second members D and E are adjusted such that, when the first joint surface Df is kept facing upward and the second joint surface Ef facing downward is made to oppose the first joint surface Df, in a plan view, the contour formed due to continuation of the intersection Gp of the first adhesive after application G1 (see FIG. 2B) encompasses the glass plate Eg of the second member E and the outer edges of the first and second members D and E coincide each other. At this point, the first and second adhesives after application G1 and G2 are not in contact yet. Once the dispositions of the first and second members D and E are adjusted, the first and second members D and E are accommodated in the chamber 51 (S11). The first and second members D and E may be accommodated in the chamber 51 manually by a human or by a robot hand (not illustrated) being controlled by the controller 90.

Once the first and second members D and E are accommodated in the chamber 51, the chamber 51 is tightly closed, and the vacuum pump 53 is operated so as to reduce pressure in the chamber 51 (S12) and achieve a predetermined degree of vacuum in the chamber 51. The predetermined degree of vacuum as referred to herein is pressure of such a degree that it is possible to suppress formation of bubbles (formation of voids) inside the adhesives G when the first and second adhesives after application G1 and G2 are brought into contact. Once the predetermined degree of vacuum is achieved in the chamber 51, the first and second adhesives after application G1 and G2 are brought into contact so as to adhere the first and second members D and E to each other (adhering step: S13). The adhering of the first and second members D and E is typically performed by moving vertically downward the second suction stage 20B suction-holding the second member E. At this point, since the thickness of the first adhesive after application G1 is the first predetermined thickness and the thickness of the second adhesive after application G2 is the second predetermined thickness, the outer edges (contours) of the faces of the first and second adhesives after application G1 and G2 in contact with each other fall within the outer frame Er which is on an outer side of the glass plate Eg of the second member E, so it is possible to eliminate the possibility of the outer edges (outer contours) being visible through the glass plate Eg.

Once the first and second members D and E are adhered to each other, the second member E is pushed relative to and toward the first member D (S14). This pushing step (S14) is performed such that the adhesive G interposed between the first and second members D and E spreads and assumes a predetermined thickness. By performing the pushing step (S14), a difference between a coating area and a wetted area (an area of the faces of the first and second adhesives after application G1 and G2 in contact with each other) can be suppressed. After the pushing step (S14) is performed, the UV irradiator 45 is used to irradiate the adhesive G with an ultraviolet ray in order to cure the adhesive G (S15). When the adhesive G has cured and becomes the adhesive layer GL having the predetermined thickness, the first and second members D and E are fixed by the adhesive layer GL, whereby the joined member C is formed. The thus manufactured joined member C is removed from the chamber 51 (S16). When removing the joined member C from the chamber 51, the vacuum pump 53 is stopped so that there is no pressure difference between the inside and outside of the chamber 51, and then the chamber 51 is opened. A timing at which to stop the vacuum pump 53 may fall at any point between completion of the pushing step (S14) and the opening of the chamber 51. Removal of the joined member C from the chamber 51 may be performed manually by a human or may be performed by a robot hand (not illustrated) being controlled by the controller 90.

As has been described above, in the die head 10 according to the present embodiment, the end portion thickness 11eL (see FIG. 4C) is 0.1 mm to 1.0 mm; thus, even when a protruding object is present immediately outside (outside in the direction perpendicular to the X direction) the region of the first joint surface Df on which the adhesive G is applied, it is possible to prevent the die head 10 from interfering with the protruding object. Further, in the application device 1 according to the present embodiment, the camera 40 is used to confirm the positions of the members D and E on the placement tables 20 when the adhesive G is applied onto the members D and E; therefore, the adhesive G can be applied onto the members D and E at the predetermined positions. Furthermore, in the joined member manufacturing apparatus 100 according to the present embodiment, the first and second members D and E are adhered to each other by applying the adhesive G onto both the first and second members D and E in such a manner that the adhesive G encompasses the outer edge (predetermined regions) of the glass plate Eg while a predetermined thickness of the same is such that the adhesive G does not extend outwardly beyond the joint surfaces Df and Ef; thus, it is possible to manufacture a joined member C which has an adhesive layer GL with a predetermined thickness and with which it possible to eliminate the possibility that the contours of the first and second adhesives after application G1 and G2, when brought into contact with each other, are visible from the glass plate Eg.

In the description above, the adhesive G is a substance which, from a liquid state having flowability and a predetermined viscosity, is irradiated with an ultraviolet ray to be cured, thereby (with an increase in the viscosity) exhibiting adhesiveness; however, the adhesive G may be a substance that is cured by being heated instead of, or in addition to, being irradiated with an ultraviolet ray, thereby (with an increase in the viscosity) exhibiting adhesiveness.

In the description above, the length 11rW of the reservoir forming groove 11r in the longitudinal direction is larger than the width 11pW of the first protrusion 11p where the ejection port forming groove 11h is formed; however, the length 11rW may be smaller than the width 11pW or may be equal to the length of the ejection port forming groove 11h in the longitudinal direction.

In the description above, the moving device 30 moves the placement table 20 relative to the die head 10 having a fixed position; however, the die head 10 may be moved relative to the placement table 20 having a fixed position or both the die head 10 and the placement table 20 may be moved relative to each other.

In the description above, the application device 1 of the joined member manufacturing apparatus 100 is provided with the first application device 1A for applying the adhesive G onto the first member D and the second application device 1B for applying the adhesive G onto the second member E; however, one application device 1 may singly apply the adhesive G onto both the first and second members D and E. In this case, the first application device would also function as the second application device. Alternatively, one or more part(s) of the elements constituting the application device 1 may have the function of the counterpart element (i.e., may be shared between the two members D and E). For example, while the placement table 20 and the moving device 30 may be provided one each for the first member D and the second member E, the die head 10, the adhesive supply unit 16, and the camera 40 may be shared between the first and second members D and E. Alternatively, one or two from among the die head 10, the adhesive supply unit 16, and the camera 40 may be shared.

In the description above, the first and second members D and E onto which the adhesive G is applied while the members D and E are on the placement table(s) 20 of the application device 1 are moved to the first suction stage 20A or the second suction stage 20B outside the application device 1; however, the adhesive G may be applied onto the first member D while the first member D is being suction-held on the first suction stage 20A and/or the adhesive G may be applied onto the second member E while the second member E is being suction-held on the second suction stage 20B. In this case, the first holding tool and/or the second holding tool each functions also as a placement table and is provided with a moving device 30.

In the description above, the first and second adhesives after application G1 and G2 are semi-cured before the first and second members D and E are adhered to each other: however, in a case where, considering, for example, properties of the adhesive G used or the orientation in which the adhesive G is applied (up or down), omitting the semi-curing of the first and second adhesives after application G1 and G2 would not cause inconvenience, then the first adhesive after application G1 and/or the second adhesive after application G2 may not be semi-cured. In a case where neither the first nor the second adhesives after application G1 or G2 need to be semi-cured, the UV irradiator 45 may not be provided. However, in a case where it is better to semi-cure the adhesive G in view of the properties thereof, since semi-curing both the first and second adhesives after application G1 and G2 makes it possible to avoid deformation of the first and second adhesives after application G1 and G2 when the first and second members D and E are adhered to each other, the difference between a coating area and a wetted area can be suppressed, so it is preferable to carry out the semi-cure.

In the description above, the first and second members D and E are adhered to each other in the chamber 51 in which pressure has been reduced to a predetermined degree of vacuum;

however, in a case where adhering the members D and E in an environment in which pressure has not been reduced would not cause inconvenience, e.g. a case where adhering the members D and E under atmospheric pressure would cause substantially no formation of bubbles inside the adhesive G, the chamber 51, the suction tube 52, and the vacuum pump 53 may not be provided.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS
AND SYMBOLS

1 application device
10 die head
10*h* ejection port
10*r* reservoir
11 first head
11*c* communication part forming groove
11*e* first outer edge
11*e*L end portion thickness
11*f* first opposing face
11*h* ejection port forming groove
11*r* reservoir forming groove
12 second head
12*f* second opposing face
20 placement table
20A first suction stage
20B second suction stage
30 moving device
40 camera
45 UV irradiator
51 chamber
53 vacuum pump
90 controller
100 joined member manufacturing apparatus
D first member
Df first joint surface
E second member
Ef second joint surface
G adhesive

The invention claimed is:

1. A joined member manufacturing apparatus, comprising:
an application device comprising a die head, the die head configured to apply a material onto an application target surface of an application target member configured to receive the material by ejecting the material onto the application target surface during relative movement of the die head along the application target surface,
the die head comprising
a first head constituting member comprising a first opposing face formed on the first head constituting member, and
a second head constituting member comprising a second opposing face formed on the second head constituting member, the second opposing face contacting the first opposing face,
wherein the first opposing face comprises an ejection port forming groove formed in the first opposing face, the ejection port forming groove forming an elongated ejection port through which the material is ejected to outside the die head,
wherein one face of the die head has a protrusion protruding outward from the one face of the die head, the ejection port being formed on a tip end of the protrusion,
wherein the ejection port extends in a direction intersecting the direction in which the die head moves relatively with respect to the application target surface while applying the material,
wherein the ejection port is formed over the entirety of the tip end of the protrusion except for both ends in the direction in which the ejection port extends, and
wherein a distance between the ejection port forming groove and an outer edge of the first opposing face is 0.1 mm to 1.0 mm, the distance being at a position where the ejection port is formed in the direction in which the ejection port extends;

the apparatus further comprising:
a first suction stage configured to suction-hold a first application target member, a first application target surface of which is configured to receive the material;
a second suction stage configured to suction-hold a second application target member, a second application target surface of which is configured to receive the material, the second suction stage being disposed in a manner in which the second application target member suction-held on the second suction stage can be adhered onto the first application target member suction-held on the first suction stage;
an ultraviolet irradiator configured to radiate an ultraviolet ray; and
a chamber formed to have a size enabling the chamber to accommodate the first and second suction stages at the same time, the chamber being configured such that a degree of vacuum inside the chamber is adjustable by an operation of a vacuum pump, wherein
the material is configured such that viscosity of the material increases to lose flowability when the material is irradiated with an ultraviolet ray.

2. The joined member manufacturing apparatus according to claim 1, wherein
the first opposing face further comprises a reservoir forming groove and a communication part forming groove formed in the first opposing face,
the reservoir forming groove forming a reservoir configured to temporarily hold the material, the reservoir forming groove having a larger width than a width of the ejection port in the direction in which the ejection port extends,
the communication part forming groove providing communication between the ejection port forming groove and the reservoir forming groove, and
a width of the first opposing face at a portion where the ejection port forming groove is formed is smaller than a width of the first opposing face at a portion where the reservoir forming groove is formed, these widths being widths in the direction in which the ejection port extends.

3. The joined member manufacturing apparatus according to claim 1, wherein
the application device further comprises
a placement table on which an application target member configured to receive the material is placed, and
a position confirmation device configured to ascertain a position of the application target member configured to receive the material placed on the placement table relative to the die head.

4. The joined member manufacturing apparatus according to claim 3, further comprising:
a moving device configured to move the placement table relative to the die head; and
a controller configured to, while the position confirmation device is performing confirmation, control movement of the moving device in a manner in which a predetermined position of an application target surface of the application target member configured to receive the material placed on the placement table meets a reference position of the die head.

5. The joined member manufacturing apparatus according to claim 4, wherein the moving device is configured to be able to move the placement table in the direction in which the ejection port extends and in a direction horizontally perpendicular to the direction in which the ejection port extends.

6. The joined member manufacturing apparatus according to claim 4, wherein the moving device is configured to be able to move the placement table vertically relative to the die head and rotate the placement table about an imaginary axis extending vertically through a centroid of the placement table.

7. The joined member manufacturing apparatus according to claim 1, wherein a height by which the protrusion protrudes is 3 mm to 8 mm.

8. A method for manufacturing a joined member in which two application target members are adhered to each other by using the joined member manufacturing apparatus according to claim 3, the method comprising:
a first placing step of placing the first application target member onto the placement table;
a first applying step of, using the die head, applying the material onto the first application target surface of the first application target member placed on the placement table;
a second placing step of placing the second application target member onto the placement table;
a second applying step of, using the die head, applying the material onto the second application target surface of the second application target member placed on the placement table; and
an adhering step of adhering the first and second application target members having received application of the material to each other in a manner in which the material applied on the first application target member and the material applied on the second application target member are brought into contact with each other.

* * * * *